(12) United States Patent
Doh et al.

(10) Patent No.: US 10,349,033 B2
(45) Date of Patent: Jul. 9, 2019

(54) THREE-DIMENSIONAL MAP GENERATING AND DISPLAYING APPARATUS AND METHOD

(71) Applicant: Korea University Research and Business Foundation, Seoul (KR)

(72) Inventors: Nak Ju Doh, Seoul (KR); In Sik Baek, Busan (KR); Keon Yong Lee, Seoul (KR)

(73) Assignee: TeeLabs Co., Ltd., Seoul (KR)

(*) Notice: Subject to any disclaimer, the term of this patent is extended or adjusted under 35 U.S.C. 154(b) by 8 days.

(21) Appl. No.: 15/742,206

(22) PCT Filed: Jul. 7, 2016

(86) PCT No.: PCT/KR2016/007359
§ 371 (c)(1),
(2) Date: Jan. 5, 2018

(87) PCT Pub. No.: WO2017/007254
PCT Pub. Date: Jan. 12, 2017

(65) Prior Publication Data
US 2018/0205925 A1    Jul. 19, 2018

(30) Foreign Application Priority Data

Jul. 8, 2015  (KR) .................. 10-2015-0097442
May 11, 2016  (KR) .................. 10-2016-0057705

(51) Int. Cl.
*G09G 5/00*    (2006.01)
*H04N 13/117*  (2018.01)
(Continued)

(52) U.S. Cl.
CPC ............. *H04N 13/117* (2018.05); *G06F 3/01* (2013.01); *G06F 3/0346* (2013.01);
(Continued)

(58) Field of Classification Search
CPC .... H04N 13/117; H04N 13/04; H04N 13/383; H04N 13/271; H04N 13/344;
(Continued)

(56) References Cited

U.S. PATENT DOCUMENTS 5,805,782 A * 9/1998 Foran ...................... G06T 15/80
                                                                345/426
6,229,549 B1 * 5/2001 Smith ...................... G06T 15/04
                                                                345/419
(Continued)

FOREIGN PATENT DOCUMENTS

JP    2008219390 A    9/2008
JP    2009157897 A    7/2009
(Continued)

*Primary Examiner* — Trang U Tran
(74) *Attorney, Agent, or Firm* — Fox Rothschild LLP

(57) ABSTRACT

A three-dimensional map generating and displaying apparatus according to an exemplary embodiment of the present invention includes an acquiring unit which acquires pose information including position and rotation information on photographing points at which three-dimensional information on a three-dimensional space is acquired with respect to a global coordinate system; a generating unit which generates a plurality of local coordinate systems for the three-dimensional space according to at least one of a spatial contiguity and a temporal contiguity of the photographing points, based on the acquired pose information; and a display unit which when an observer of a virtual reality is located in the three-dimensional space, finds the photographing point corresponding to a point at which the observer is located using the plurality of local coordinate system and generates and displays the three-dimensional map using the three-dimensional information acquired from the photographing point.

17 Claims, 12 Drawing Sheets

(51) Int. Cl.
*H04N 13/122* (2018.01)
*H04N 13/361* (2018.01)
*H04N 13/383* (2018.01)
*G06T 7/73* (2017.01)
*G06T 7/579* (2017.01)
*G06F 3/01* (2006.01)
*G06F 3/0481* (2013.01)
*G06T 3/00* (2006.01)
*G06T 7/00* (2017.01)
*G06T 17/05* (2011.01)
*G06T 17/20* (2006.01)
*G06T 19/00* (2011.01)
*G06F 3/0346* (2013.01)
*H04N 13/344* (2018.01)
*H04N 13/282* (2018.01)
*H04N 13/271* (2018.01)
*H04N 5/232* (2006.01)
*H04N 13/00* (2018.01)

(52) U.S. Cl.
CPC .............. *G06F 3/0481* (2013.01); *G06T 3/00* (2013.01); *G06T 7/00* (2013.01); *G06T 7/579* (2017.01); *G06T 7/74* (2017.01); *G06T 17/05* (2013.01); *G06T 17/20* (2013.01); *G06T 19/00* (2013.01); *H04N 13/122* (2018.05); *H04N 13/271* (2018.05); *H04N 13/282* (2018.05); *H04N 13/344* (2018.05); *H04N 13/361* (2018.05); *H04N 13/383* (2018.05); *G06T 2207/10012* (2013.01); *G06T 2207/10028* (2013.01); *G06T 2207/20076* (2013.01); *G06T 2207/30201* (2013.01); *G06T 2207/30244* (2013.01); *H04N 5/23238* (2013.01); *H04N 2013/0081* (2013.01); *H04N 2013/0096* (2013.01)

(58) Field of Classification Search
CPC .. H04N 13/361; H04N 13/122; H04N 13/282; H04N 5/23238; H04N 2013/0081; H04N 2013/0096; G09G 5/00; G06T 7/579; G06T 7/74; G06T 3/00; G06T 7/00; G06T 17/05; G06T 17/20; G06T 19/00; G06T 2207/10012; G06T 2207/10028; G06T 2207/20076; G06T 2207/30201; G06T 2207/30244; G06F 3/01; G06F 3/0481
USPC .................... 345/633, 629; 348/51, 143, 144
See application file for complete search history.

(56) References Cited

U.S. PATENT DOCUMENTS

| | | | |
|---|---|---|---|
| 7,614,954 B2* | 11/2009 | Okazaki | A63F 13/10 463/32 |
| 8,593,486 B2* | 11/2013 | Kodaira | G06T 15/205 345/629 |
| 8,681,151 B2* | 3/2014 | Coombe | G06T 19/00 345/423 |
| 2015/0206337 A1* | 7/2015 | Roimela | G06T 7/60 345/419 |

FOREIGN PATENT DOCUMENTS

| | | |
|---|---|---|
| JP | 2012053896 A | 3/2012 |
| JP | 2013142956 A | 7/2013 |
| KR | 20130142336 A | 12/2013 |
| KR | 20140054710 A | 5/2014 |

* cited by examiner

[FIG. 1]
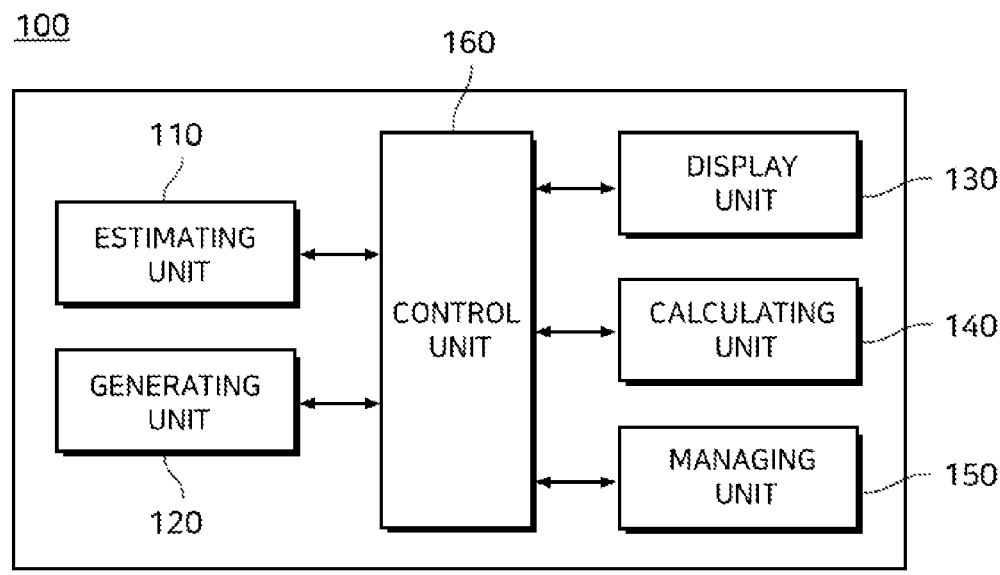
[FIG. 2]
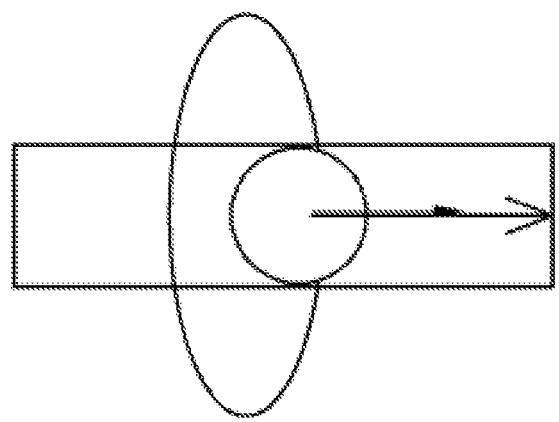
① SET BOUNDING BOX
⟶ MAJOR AXIS
----- LINE OF SIGHT

[FIG. 3]
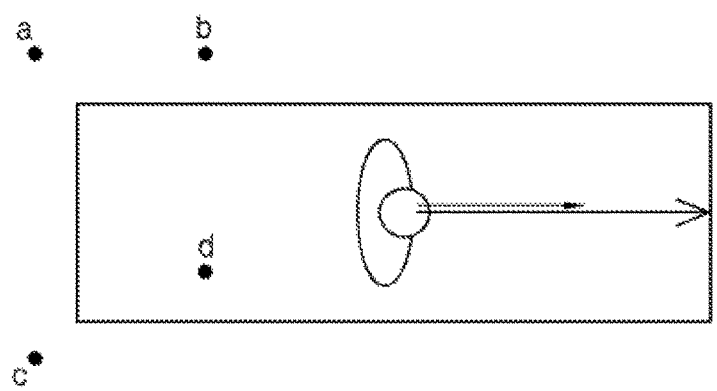
② CHANGE RATIO OF BOUNDING BOX
 WHEN M = 1, INCREASE SIZE OF BOUNDING BOX
 UNTIL ONE INFORMATION ACQUISITION POINT IS INCLUDED
● : INFORMATION ACQUISITION POINT

[FIG. 4]
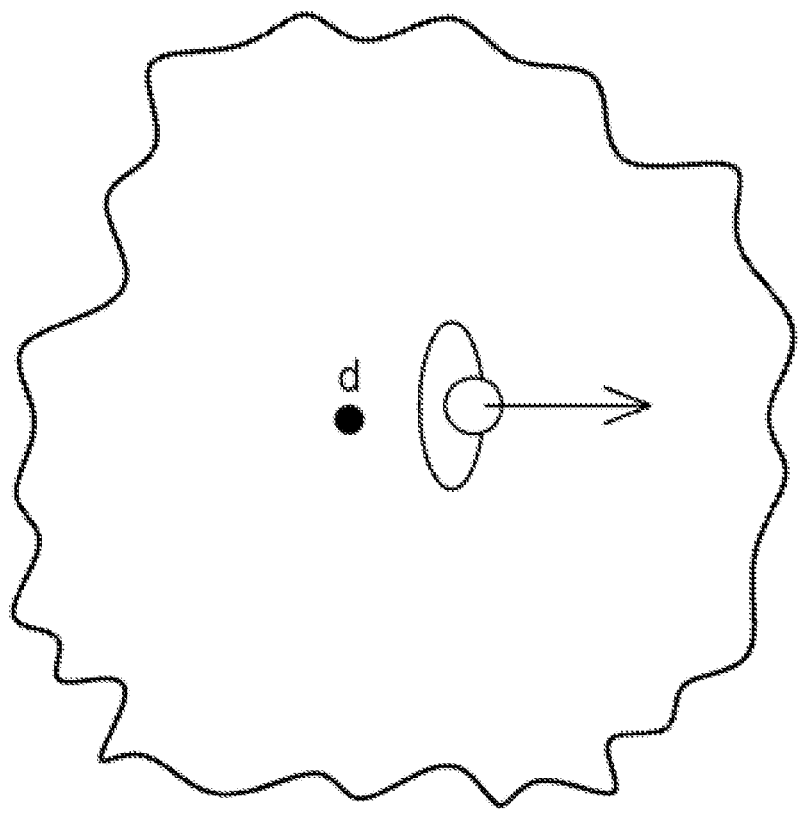
③ INCREASE SIZE OF BOUNDING BOX
UNTIL SELECTED DATA IS DISPLAYED
(IN CASE OF GROUP, LOAD ENTIRE GROUP)
 : SPACE RESTORED BY DATA OF d

[FIG. 5]
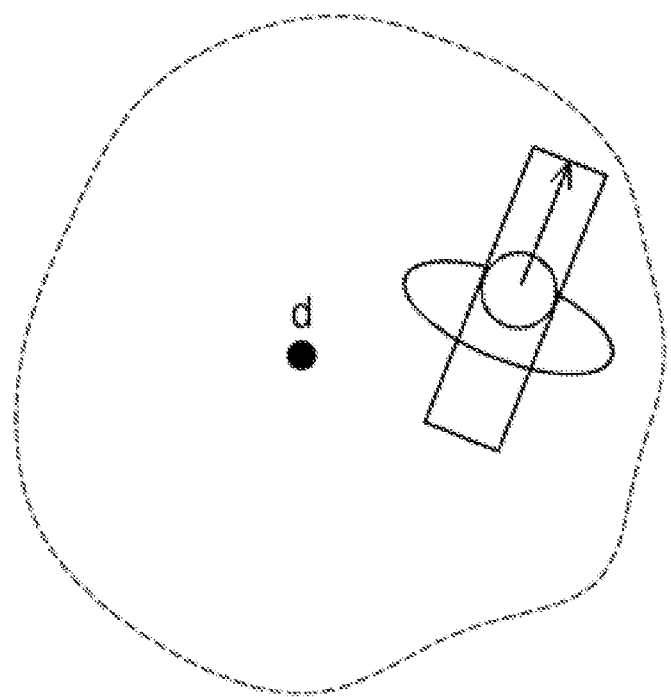
④ AT THE TIME OF LEAVING, REMOVE DATA
◯ : THREE-DIMENSIONAL SPACE TO BE REMOVED

[FIG. 6]
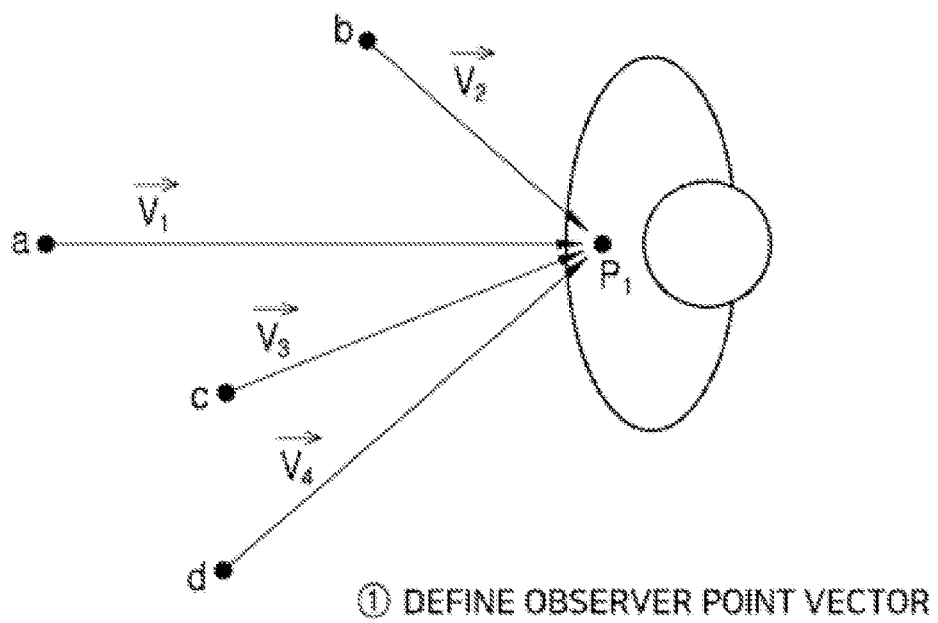
① DEFINE OBSERVER POINT VECTOR

[FIG. 7]
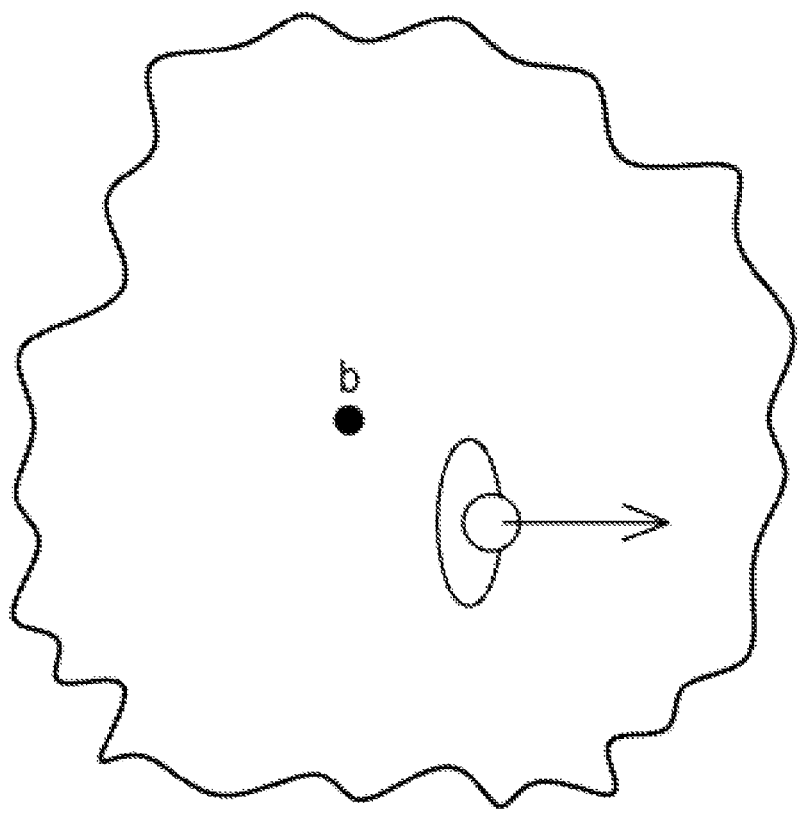
② DISPLAY SELECTED DATA
(IN CASE OF GROUP, LOAD GROUP)
ASSUME THAT M = 1
 : SPACE RESTORED BY DATA OF b

[FIG. 8]
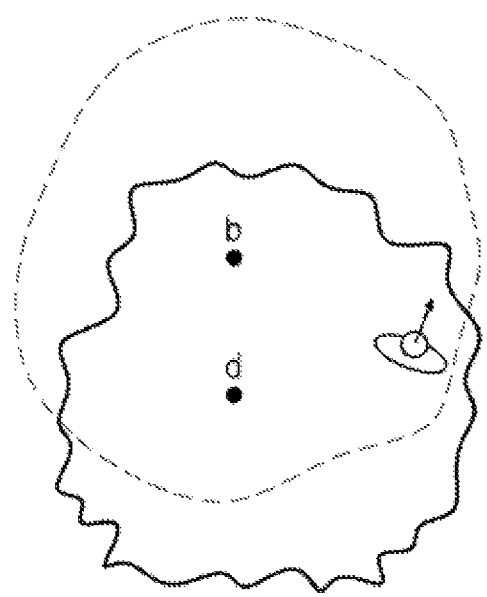
③ WHEN EXISTING INDEX VALUE IS THRESHOLD OR LOWER
(AT THE TIME OF LEAVING), REMOVE DATA AND RESTORE OTHER DATA
◯ : THREE-DIMENSIONAL INFORMATION WHICH WAS b
◯ : THREE-DIMENSIONAL INFORMATION d

[FIG. 9]
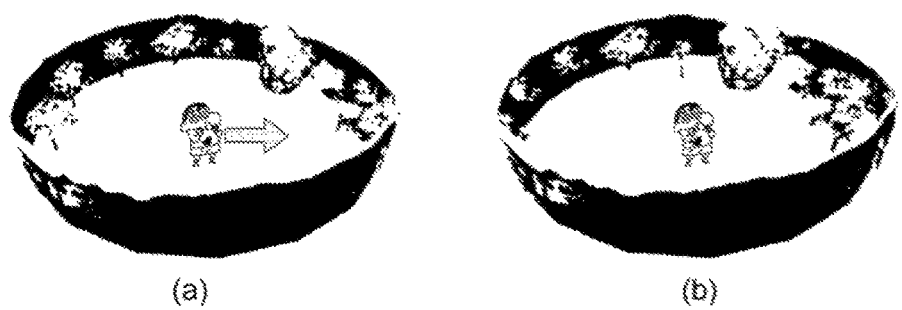
(a)                    (b)

[FIG. 10]
(a)
(b)
(c)

[FIG. 11]
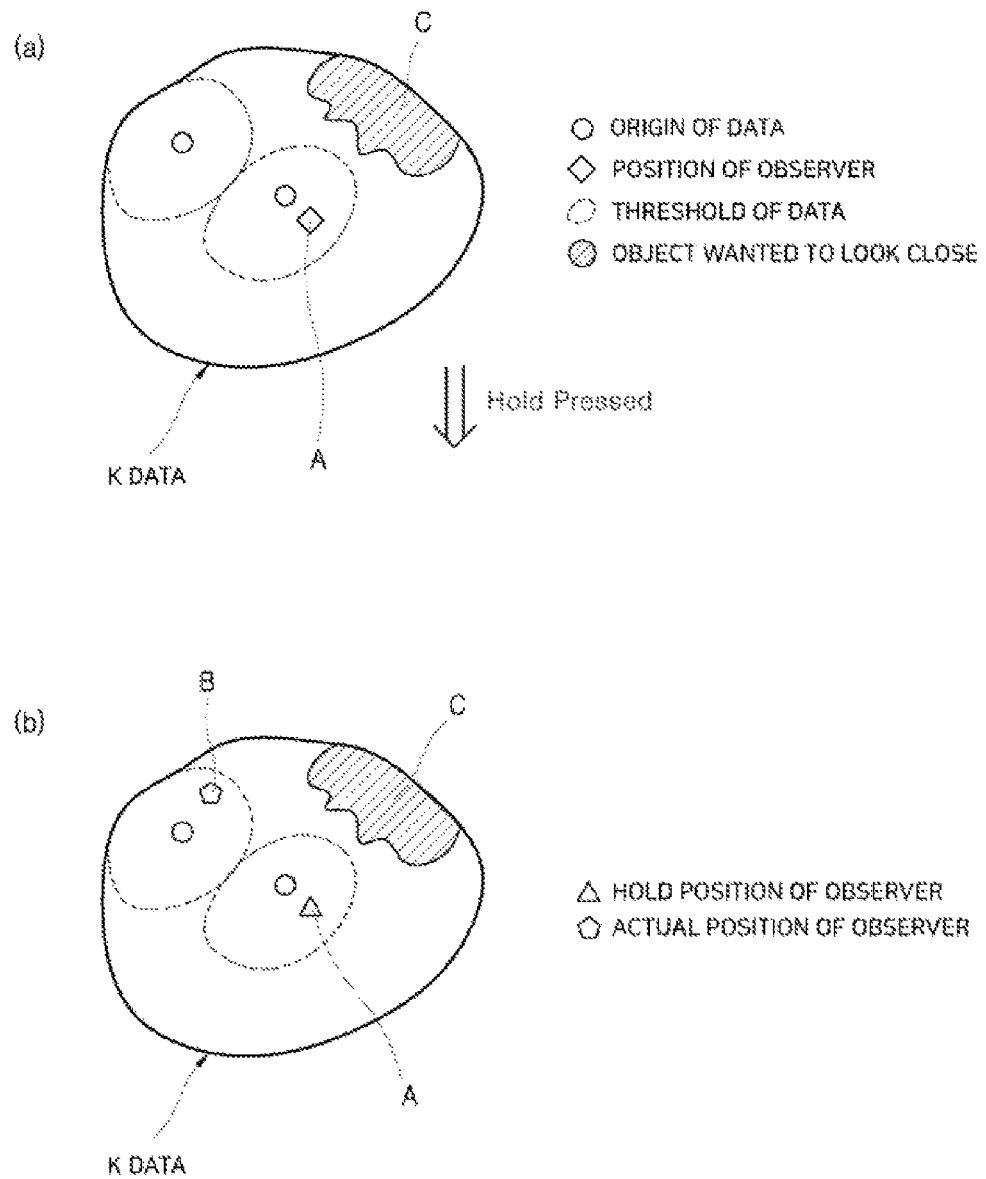

[FIG. 12]
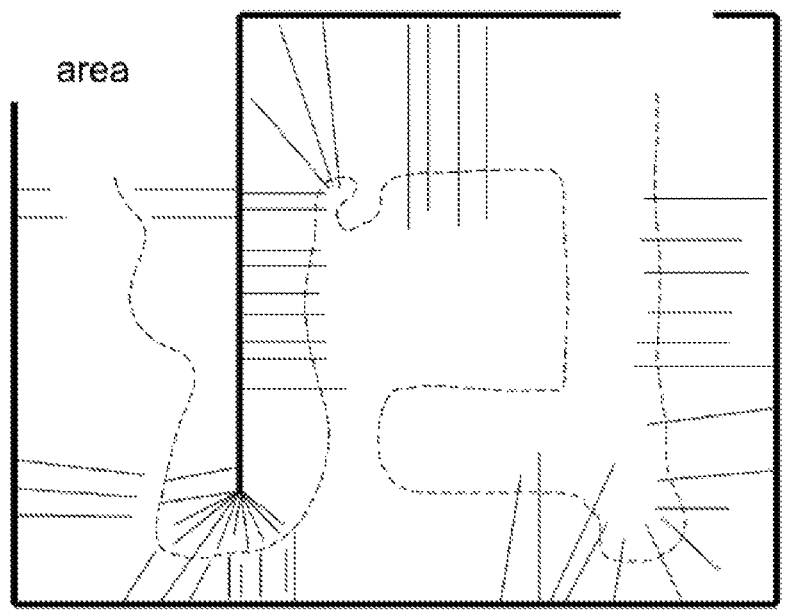

[FIG. 13]
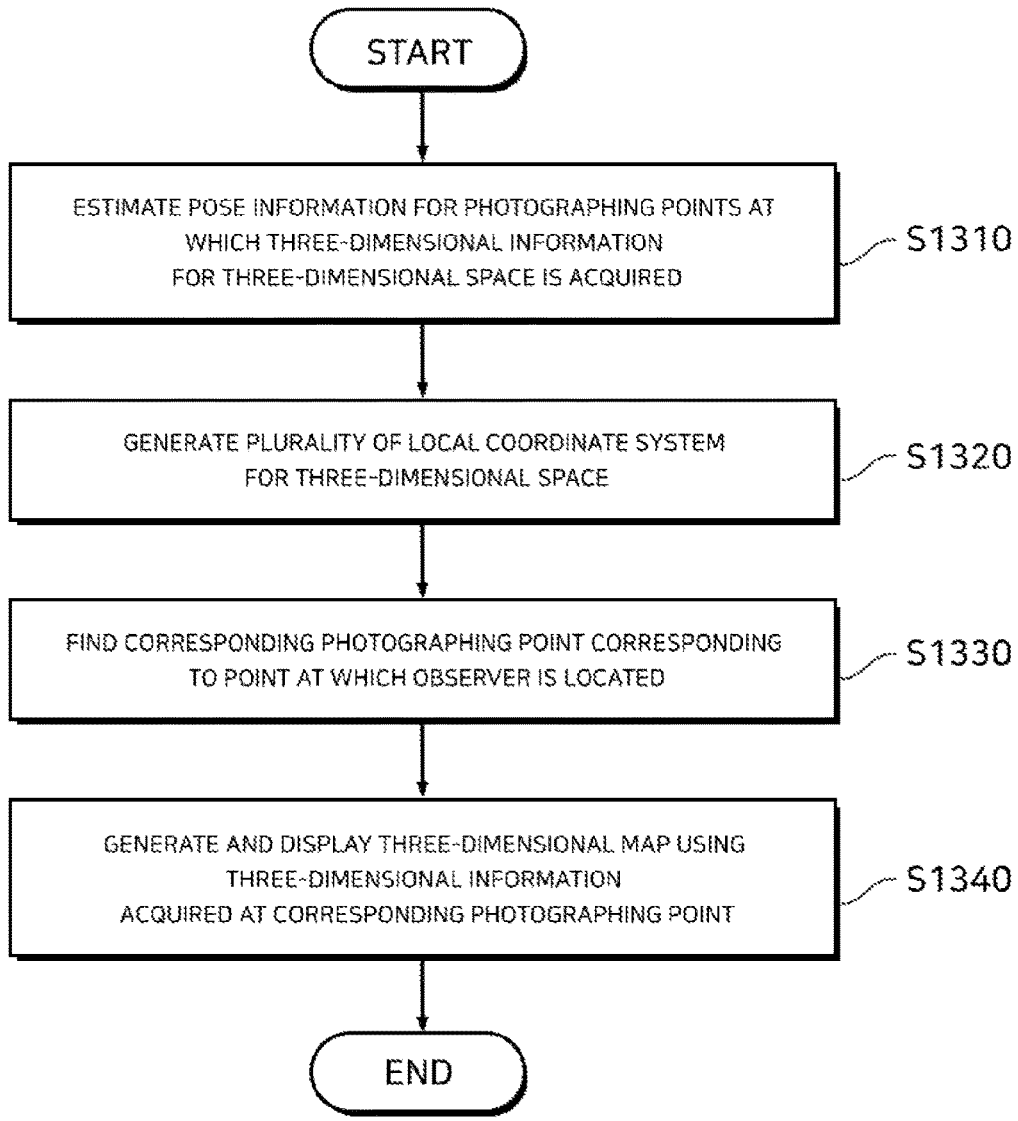

THREE-DIMENSIONAL MAP GENERATING AND DISPLAYING APPARATUS AND METHOD

TECHNICAL FIELD

The present document relates to a three-dimensional map generating and displaying apparatus and method.

BACKGROUND

Recently, as performances of PCs or smart devices become more advanced and devices through which a real-world image is three-dimensionally viewed such as a head mount display (HMD) are sold on the market, an interest on a three-dimensional map which simultaneously displays a color image for a space and depth information of the image is increased.

An existing two-dimensional map which is serviced by a portal has limitations in that the map can only be rotated with respect to x, y, and z axes (three degrees of freedom). However, in the three-dimensional map, not only rotation with respect to each axis, but also viewpoint movement in a three-dimensional space is allowed so that there is an advantage in that the map can be viewed while changing the viewpoint with a total of six degrees of freedom.

However, due to a limitation in a technique which generates such a three-dimensional map in an actual environment, most current three-dimensional maps are three-dimensional models which are created by a person using a three-dimensional modeling program such as a computer-aided design (CAD). Therefore, it is a common opinion in the industry that the realism of the current three-dimensional maps is less than that of the three-dimensional model using photographs taken in reality in terms of color and resolution. Alternatively, as in a road view provided by Kakao Corp., the current three-dimensional maps are limited to a form showing a 2D panorama photograph at a place where the photograph is taken.

SUMMARY

Technical Problem

The present solution provides a three-dimensional map generating and displaying apparatus which finds a photographing point corresponding to position information of an observer (avatar) in a virtual reality space to generate and display a three-dimensional map using the three-dimensional information acquired at the photographing point and a method thereof.

Technical problems of the present solution are not limited to the above-mentioned technical problems, and other technical problems, which are not mentioned above, can be clearly understood by those skilled in the art from the following descriptions.

Technical Solution

In some scenarios, the present solution concerns a three-dimensional map generating and displaying apparatus including: an acquiring unit which acquires pose information including position and rotation information on photographing points at which three-dimensional information on a three-dimensional space is acquired with respect to a global coordinate system; a generating unit which generates a plurality of local coordinate systems for the three-dimensional space according to at least one of a spatial contiguity and a temporal contiguity of the photographing points, based on the acquired pose information; and a display unit which, when an observer of the virtual reality is located in the three-dimensional space, finds the photographing point corresponding to a point at which the observer is located using the plurality of local coordinate system and generates and displays the three-dimensional map using the three-dimensional information acquired from the photographing point.

The three-dimensional map generating and displaying apparatus may further include: a calculating unit which calculates a grouping index defined as at least one of an estimated error between pose information associated with the plurality of generated local coordinate systems, an error and a distortion of the three-dimensional information acquired from the selected photographing points; and a managing unit which compares the calculated grouping index with a specific threshold value to generate a group local coordinate system and an independent local coordinate system by dividing the plurality of local coordinate systems and manages the generated group local coordinate system and the independent local coordinate system in one global coordinate system.

The three-dimensional map generating and displaying apparatus may further include: a calculating unit which calculates a spatial contiguity and a temporal contiguity between pose information associated with the plurality of generated local coordinate systems; and a managing unit which compares the calculated spatial contiguity and temporal contiguity with a specific threshold value to generate a group local coordinate system and an independent local coordinate system by dividing the plurality of local coordinate systems and manages the generated group local coordinate system and the independent local coordinate system in one global coordinate system.

The generating unit may further perform an operation of selecting photographing points which satisfies a predetermined condition among the photographing points and an operation of generating a plurality of local coordinate systems for the three-dimensional space is performed on the selected photographing points, and the predetermined condition may be a condition for selecting photographing points at which a predetermined number or more of three-dimensional information is acquired or a condition for selecting photographing points at which the number of acquired three-dimensional information is ranked to be a predetermined level or higher.

The pose information may be acquired using a simultaneous localization and mapping (SLAM) algorithm or position information input by a user.

When the observer is located at a point other than the photographing point in the three-dimensional space, the display unit may set a major axis of a bounding volume having a specific shape to pass through a center of the observer and to be parallel to a line of sight of the observer and increase or reduce a size of the bounding volume until a predetermined number of photographing points is included in the bounding volume to find the corresponding photographing point included in the bounding volume and generate and display the three-dimensional map using the three-dimensional information acquired at the corresponding photographing point.

When a plurality of photographing points is included in the bounding volume, the display unit may select three-dimensional information having a minimum time difference from three-dimensional information of the existing position among the three-dimension information acquired from the plurality of photographing points based on a photographing time of the three-dimensional information acquired from the plurality of photographing points and generate and display the three-dimensional map using the selected three-dimensional information.

When the three-dimensional map is generated and displayed, if a length of the major axis of the bounding volume is larger than a predetermined distance due to the increase of the size of the bounding volume, the display unit may generate and display a three-dimensional map corresponding to the entire three-dimensional space based on the global coordinate system so that two three-dimensional maps are automatically switched according to the position of the observer to be displayed.

When the observer rotates, the display unit may axially rotate the bounding volume using a line of sight vector for a line of sight of the observer to generate and display the three-dimensional map using three-dimensional information acquired at the corresponding photographing point included in the bounding volume and in the case of a line of sight with three degrees of freedom, a line of sight vector may include vectors corresponding to roll, pitch, and yaw modes and in the case of a line of sight with one degree of freedom, the line of sight vector may include a vector corresponding to the major axis of the bounding volume.

When the observer is located at a point other than the photographing point in the three-dimensional space, the display unit may set a plurality of cost functions based on a plurality of vectors from the photographing points to the point at which the observer is located, find the photographing point at which a value of the set cost function becomes minimum, and generate and display the three-dimensional map using the three-dimensional information acquired at the corresponding photographing point.

When there is a plurality of photographing points at which a value of the set cost function becomes minimum, the display unit may select three-dimensional information having a minimum time difference from three-dimensional information of the existing position among the three-dimension information acquired from the plurality of photographing points based on a photographing time of the three-dimensional information acquired from the plurality of photographing points and generate and display the three-dimensional map using the selected three-dimensional information.

When the three-dimensional map is generated and displayed, if lengths of the vectors from the photographing points to the observer are larger than a predetermined distance, the display unit may generate and display a three-dimensional map corresponding to the entire three-dimensional space based on the global coordinate system so that two three-dimensional maps are automatically switched according to the position of the observer to be displayed.

When an obstacle is included in the three-dimensional information acquired at the corresponding photographing point, the display unit may generate and display the three-dimensional map using three-dimensional information acquired at other photographing point which is the closest to the corresponding photographing point regardless of the position of the observer and the obstacle may not be included in the three-dimensional information acquired at other photographing point.

The display unit may load the three-dimensional information on the three-dimensional map which is stored in advance corresponding to a point at which the observer is located to display the three-dimensional map using the three-dimensional information whenever the observer moves.

The display unit may further perform an operation of reproducing the three-dimensional map in the format of video when the observer is located within a predetermined distance from one of the photographing points, and stopping reproducing the three-dimensional map in the format of video when the observer moves during reproduction of the three-dimensional map in the format of video to be located outside the predetermined distance from one of the photographing points.

The display unit may set a specific threshold distance value when the three-dimensional map in the format of video is reproduced and repeatedly and sequentially reproduce the three-dimensional map generated using the three-dimensional information acquired at the photographing points within a threshold distance value.

When the three-dimensional map in the format of video is reproduced, after setting a photographing point which is the farthest from the position of the observer as a result of searching the photographing points included within a threshold distance circle in which the position of the observer is a center and a threshold distance value is a radius in a reverse order of the time with respect to the photographing time of the photographing point which is the closest to the position of the observer with respect to the position of the observer as a section repeat starting point and a photographing point which is the farthest from the position of the observer as a result of searching the photographing points in the order of time with respect to a photographing time of the photographing point which is the closest to the position of the observer as a section repeat finishing point, the display unit may sequentially and repeatedly reproduce from the three-dimensional map generated using the three-dimensional information photographed at the section repeat starting point to the three-dimensional map generated using the three-dimensional information photographed at the section repeat finishing point.

In some scenarios, a three-dimensional map generating and displaying method according to the present solution includes: acquiring pose information including position and rotation information on photographing points at which three-dimensional information on a three-dimensional space is acquired with respect to a global coordinate system; generating a plurality of local coordinate systems for the three-dimensional space according to at least one of a spatial contiguity and a temporal contiguity of the photographing points, based on the acquired pose information; and when an observer of the virtual reality is located in the three-dimensional space, finding the photographing point corresponding to a point at which the observer is located using the plurality of local coordinate systems and generating and displaying the three-dimensional map using the three-dimensional information acquired from the photographing point.

The generating of a plurality of local coordinate systems may further include selecting photographing points which satisfy a predetermined condition among the photographing points, at least one of the spatial contiguity and the temporal contiguity may be calculated for the selected photographing points, and the predetermined condition may be a condition for selecting photographing points at which a predetermined number or more of three-dimensional information is acquired or a condition for selecting photographing points at which the number of acquired three-dimensional information is ranked to be a predetermined level or higher.

The generating and displaying of a three-dimensional map may include setting a major axis of a bounding volume having a specific shape to pass through a center of the observer and to be parallel to a line of sight of the observer when the observer is located at a point other than the photographing point in the three-dimensional space; finding the photographing point included in the bounding volume by increasing or reducing a size of the bounding volume until a predetermined number of photographing points is included in the bounding volume; and generating and displaying the three-dimensional map using three-dimensional information acquired at the corresponding photographing point.

The generating and displaying of a three-dimensional map may further include axially rotating the bounding volume using a line of sight vector for a line of sight of the observer to generate and display the three-dimensional map using three-dimensional information acquired at the corresponding photographing point included in the bounding volume and in the case of a line of sight with three degrees of freedom, such as a head mounted display (HMD), the line of sight vector may include vectors corresponding to roll, pitch, and yaw modes and in the case of a line of sight with one degree of freedom, such as overhead view, the line of sight vector may include a vector corresponding to the major axis of the bounding volume.

The generating and displaying of a three-dimensional map may include setting a plurality of cost functions based on a plurality of vectors from the photographing points to a point at which the observer is located when the observer is located at a point other than the photographing point in the three-dimensional space; finding the photographing point at which a value of the set cost function becomes minimum; and generating and displaying the three-dimensional map using the three-dimensional information acquired at the corresponding photographing point.

Specific matters of other scenarios of the present solution are included in the detailed description and the accompanying drawings.

Advantageous Effects

In some scenarios of the present solution, it is possible to find a photographing point corresponding to position information of an observer (avatar) in a virtual reality space to generate and display a three-dimensional map using the three-dimensional information acquired at the photographing point.

DESCRIPTION OF DRAWINGS

FIG. 1 is a block diagram illustrating to explain a three-dimensional map generating and displaying apparatus.

FIGS. 2, 3, 4 and 5 are views illustrating to explain the present solution which generates and displays a three-dimensional map when a bounding volume is used.

FIGS. 6, 7 and 8 are views illustrating to explain the present solution which generates and displays a three-dimensional map when a cost function is used.

FIG. 9 is a view illustrating an example in which a surrounding virtual reality environment is changed in accordance with movement of an observer.

FIG. 10 is a view illustrating an example of a photograph for generating a virtual reality environment and an example of a 3D screen viewed from a viewpoint of a user.

FIG. 11 is a view illustrating to explain an example which invokes and displays specific three-dimensional information regardless of an actual position of an observer in virtual reality.

FIG. 12 is a view illustrating that a space is segmented to calculate and store which information acquisition point is selected at which position in advance.

FIG. 13 is a flowchart illustrating to explain a three-dimensional map generating and displaying method.

DETAILED DESCRIPTION

Advantages and/or characteristics of the present solution and a method of achieving the advantages and characteristics will be clear by referring to the below more detailed discussion of the present solution together with the accompanying drawings. However, the present solution is not limited to the following exemplary scenarios but may be implemented in various different forms. The exemplary scenarios are provided only to complete invention of the present solution and to fully provide a person having ordinary skill in the art to which the present solution pertains with the category of the present solution, and the present solution will be defined by the appended claims. Like reference numerals indicate like components throughout the specification.

Hereinafter, the present solution will be described in detail with respect to accompanying drawings.

FIG. 1 is a block diagram illustrating a three-dimensional map generating and displaying apparatus.

Referring to FIG. 1, a three-dimensional map generating and displaying apparatus 100 may include an acquiring unit 110, a generating unit 120, a display unit 130, a calculating unit 140, a managing unit 150, and a control unit 160.

The acquiring unit 110 acquires pose information including position and rotation information on photographing points at which three-dimensional information on a three-dimensional space is acquired with respect to a global coordinate system.

Here, the global coordinate system means a reference coordinate system for the entire three-dimensional space. The three-dimensional information may include a three-dimensional image photographed at photographing points and a three-dimensional video and may be generated using a plurality of two-dimensional images generated by a plurality of cameras which can photograph the three-dimensional space at 360 degrees.

The three-dimensional video refers to image data in which there are RGB information and depth information of the video in every image frame which configures the video. At a time of executing the three-dimensional video, the system brings RGB and depth information of a time or an index at every image frame and combines two information to display. The two information is combined by distorting a shape of the RGB image using the depth information. When an original RGB image and the depth information are photographed using a normal camera, a depth for each pixel on a plane is distorted to be displayed in the format of height map which is recognized as a standard in three-dimensional graphics. When an original RGB image and the depth information are photographed by a 360-degree view camera, a distorted sphere which is shifted to a central vector of the sphere or an opposite direction of the central vector of the sphere according to the depth information corresponding to RGB data of the sphere is displayed. Description of the distortion of the spherical body is illustrated in FIG. 10.

Further, the three-dimensional information may be generated using a plurality of two-dimensional images generated by one or more cameras which may photograph a part of the three-dimensional space. Furthermore, the three-dimensional information may be generated by a combination of one or more images generated by one or more cameras which may photograph a part of the three-dimensional space and one or more lidars which can perform laser scan on the three-dimensional space.

Further, the pose information may be acquired using a simultaneous localization and mapping (SLAM) algorithm and other position estimation algorithm and also may be acquired by position information input by the user.

Desirably, the pose information may be generated using a lidar which can perform laser scan on the three-dimensional space, an inertial sensor, an indoor GPS, or a combination thereof. Further, rotation information included in the pose information may include a rolling angle, a pitch angle, and a yaw angle for the three-dimensional information.

In the meantime, a robot equipped with a device formed by coupling the lidar, the inertial sensor, and two cameras (upper and lower cameras) which are capable of photographing at 360 degrees moves in a predetermined three-dimensional space to acquire two-dimensional images (which will be processed to be three-dimensional information after being acquired) for the three-dimensional space through the cameras and acquire pose information for the two-dimensional images through the lidar. However, the present solution is not limited thereto and acquires images and pose information for the three-dimensional space through various ways.

The generating unit 120 calculates at least one of spatial contiguity of the photographing points and temporal contiguity of the photographing times corresponding to the photographing points based on the pose information to generate a plurality of local coordinate systems for the three-dimensional space.

For example, the generating unit 120 may generate two or more local coordinate systems by assigning priorities to the photographing points which are temporally and spatially adjacent to each other. Here, the local coordinate system means a reference coordinate system for each area which exists in the three-dimensional space. In such a local coordinate system, a coordinate of the photographing points may be displayed with respect to an origin of the corresponding local coordinate system. When an observer is located in a specific local coordinate system, only 3D information of the photographing points belonging to the corresponding local coordinate system may be displayed to the observer.

Desirably, even though one point on a route on which origins of the inertial sensor and the lidar equipped in the robot which moves to acquire the three-dimensional information move may be designated as the original of the local coordinate system, an arbitrary point may be randomly determined.

Further, the generating unit 120 may further perform an operation of selecting photographing points which satisfy a predetermined condition among the photographing points.

For example, after setting a condition for selecting photographing points from which a predetermined number or more of three-dimensional information is acquired (that is, a photographing point from which 10 or more of three-dimensional information is acquired) or a condition for selecting photographing points at which the number of obtained three-dimensional information is ranked to be a predetermined level or higher (that is, the photographing points are ranked within top twenty with respect to the number of three-dimensional information acquired from the photographing points) as a predetermined condition, the generating unit 120 selects the photographing points which satisfy the set condition and calculates at least one of the spatial contiguity of the selected photographing points and the temporal contiguity of the photographing times corresponding to the selected photographing points to generate a plurality of local coordinate systems for the three-dimensional space.

When an observer of the virtual reality is located in the three-dimensional space, the display unit 130 finds the photographing point corresponding to a point at which the observer is located using the plurality of local coordinate system and generates and displays the three-dimensional map using the three-dimensional information acquired from the photographing point.

At this time, the observer may be located at a point other than the photographing point in the three-dimensional space in some cases. In this case, the display unit 130 generates and displays the three-dimensional map corresponding to the position of the observer using a bounding volume. Further, the display unit 130 may generate and display the three-dimensional map corresponding to the position of the observer using a cost function.

According to the exemplary scenario, when the observer is located at a point other than the photographing point in the three-dimensional space, the display unit 130 sets a major axis of a bounding volume having a specific shape to pass through a center of the observer and to be parallel to a line of sight of the observer and increases or reduces a size of the bounding volume until a predetermined number of photographing points is included in the bounding volume to find the corresponding photographing point included in the bounding volume and generate and display the three-dimensional map using the three-dimensional information acquired at the corresponding photographing point.

In this case, when a plurality of photographing points is included in the bounding volume, the display unit 130 may select three-dimensional information having a minimum time difference from three-dimensional information of the existing position among the three-dimension information acquired from the plurality of photographing points based on a photographing time of the three-dimensional information acquired from the plurality of photographing points and generate and display the three-dimensional map using the selected three-dimensional information.

For example, when there is a plurality of three-dimensional information at one location (photographing point), the display unit 130 may provide a user interface which selects and shows one three-dimensional information. There may be several three-dimensional information photographed at a three-dimensional point at a distance which is a threshold value or shorter from a position of the observer in a virtual position, for example, within 2 m from the observer. In this case, the photographing time between the plurality of three-dimensional information may be different. If three-dimensional information 1 is an image photographed in the daytime and three-dimensional information 2 is an image photographed at night, brightness image information of two three-dimensional information may have big difference even in the same space due to the influence of light. Further, due to different photographing times, surrounding objects such as passersby or furniture arrangement may vary so that the image information may have big difference. Due to this difference, when the observer of the virtual space passes by the space, the image information may be rapidly and frequently changed. Therefore, a user of the virtual reality may feel uncomfortable.

In order to prevent the above-described problem, the exemplary scenario of the present solution suggests a priority algorithm which preferentially selects and shows three-dimensional information photographed at the same (or similar) time as the three-dimensional information which is shown in the existing position of the user when there is a plurality of three-dimensional information and uses three-dimensional information photographed at different time only when there is no such three-dimensional information. Further, an interface which informs the user that there is various three-dimensional information in the corresponding position and allows the user to select the three-dimensional information may be provided.

When the three-dimensional map is generated and displayed, if a length of the major axis of the bounding volume is larger than a predetermined distance due to the increase of the size of the bounding volume, the display unit 130 generates and displays a three-dimensional map corresponding to the entire three-dimensional space based on the global coordinate system so that two three-dimensional maps are automatically switched according to the position of the observer to be displayed. That is, the display unit 130 may generate and display the three-dimensional map corresponding to the entire three-dimensional space based on the global coordinate system or generate and display a three-dimensional map corresponding to a photographing point at a point at which the observer is located based on the local coordinate system, depending on the position of the observer.

Further, when the observer rotates, the display unit 130 may axially rotate the bounding volume using a line of sight vector for a line of sight of the observer to generate and display the three-dimensional map using three-dimensional information acquired at the corresponding photographing point included in the bounding volume. Here, in the case of a line of sight with three degrees of freedom, such as a head mounted display (HMD), the line of sight vector may include vectors corresponding to roll, pitch, and yaw modes. In the case of a line of sight with one degree of freedom, such as overhead view, the line of sight vector may include a vector corresponding to the major axis of the bounding volume.

The above-described exemplary scenario of the present solution will be described in more detail with respect to FIGS. 2 to 5 as follows.

The bounding volume refers to an invisible arbitrary space which is closed by a closed curve in a virtual space in computer graphics. A bounding volume in the game refers to a shape of a virtual object which serves as a button to start an operation, for example, when an avatar of the user enters a specific bounding volume, a main character's dialogue starts. A method which uses the bounding volume follows the following procedure.

First, a bounding volume having a specific shape as illustrated in FIG. 2 is set. For example, the bounding volume may be set to be a rectangular parallelepiped bounding box (see FIG. 2) or a three-dimensional elliptical bounding ellipsoid. In this exemplary scenario, the bounding box is set. In this case, the largest axis of the bounding box is referred to as a major axis and the major axis is set to pass through a center of a head of the observer and to be parallel to a line of sight of the observer.

Next, the size of the bounding box is increased or reduced to change a ratio thereof. At this time, as illustrated in FIG. 3, when the bounding box is increased with the same ratio K in all directions with respect to the center, the number of information acquisition points (photographing points) included in the bounding box is set to be M (M is a natural number of 1 or larger). In this case, the ratio K is changed to an arbitrary value which is larger than 0 to be repeatedly changed until the number of information acquisition points included in the bounding box (volume) is equal to M. During this process, various search algorithms such as binary search or linear search may be used.

Next, as illustrated in FIG. 4, a three-dimensional map corresponding to a space which is restored by three-dimensional information of the information acquisition point d included in the bounding box is displayed. In this case, it is possible to rotate the bounding box only using rotation at a specific axis. When there is such a restriction, if a user (observer) moves while looking at the floor, the major axis of the bounding box is perpendicular to the floor, which may not invoke appropriate three-dimensional information. Therefore, such a case may be avoided.

Next, as illustrated in FIG. 5, when the observer leaves the position, the three-dimensional information which is currently displayed is removed.

According to another exemplary scenario, when the observer is located at a point other than the photographing point in the three-dimensional space, the display unit 130 sets a plurality of cost functions based on a plurality of vectors from the photographing points to the point at which the observer is located, finds the photographing point at which a value of the set cost function becomes minimum or maximum, and generates and displays the three-dimensional map using the three-dimensional information acquired at the corresponding photographing point.

According to another exemplary scenario, when the display unit 130 sets the cost function, not only the point at which the observer is located, but also a line of sight, a movement direction, and a movement speed of the observer may be considered. In this case, when there is a plurality of photographing points at which the value of set cost function becomes maximum, the display unit 130 may select three-dimensional information having a minimum time difference from three-dimensional information of the existing position among the three-dimension information acquired from the plurality of photographing points based on a photographing time of the three-dimensional information acquired from the plurality of photographing points and generate and display the three-dimensional map using the selected three-dimensional information.

When the three-dimensional map is generated and displayed, if lengths of the vectors from the photographing points to the observer are larger than a predetermined length, the display unit 130 generates and displays a three-dimensional map corresponding to the entire three-dimensional space based on the global coordinate system so that two three-dimensional maps are automatically switched according to the position of the observer to be displayed.

The above-described exemplary scenario will be described in more detail with respect to FIGS. 6 to 9 as follows. A method using the cost function follows the following procedure.

First, when a position of the observer is P1 and positions of information acquisition points (photographing points) are a, b, c, and d in FIG. 6, observer point vectors V1, V2, V3, and V4 which are vectors from the information acquisition points (photographing points) to the position P1 of the observer are defined.

Next, a magnitude of the observer point vector Vn is set as the cost function. Next, information acquisition point "b" for the smallest vector V2 among the observer point vectors Vn in which the cost function has the smallest result value is found. In this case, in order to find a plurality of information acquisition points, as a result of the cost function, "d" which is smaller than "b" may be found. In the meantime, according to another exemplary scenario, a line of sight vector for the line of sight of the observer may be further considered to set the cost function. For example, according to another exemplary scenario, a plurality of cost functions may be set based on the line of sight vector for the line of sight of the observer and the vectors from the photographing points to the observer and the photographing point at which the value of the set cost function becomes maximum may be found.

In this case, when the line of sight vector of the observer is represented by V1 and the vectors from the photographing points to the observer are represented by V2, the cost function may be represented by Equation 1.

$$f_n(V_1, V_2) = \frac{\left(\frac{V_1 \cdot V_2}{\|V_1\| \times \|V_2\|}\right)}{\sqrt{\|V_2\|}}$$ [Equation 1]

That is, according to Equation 1, the cost function may be set such that the result value fn (v1, v2) of the cost function is directly proportional to an inner product of V1 and V2 and is inversely proportional to a magnitude of V2. The proportional relationship need not to be linear and may be an exponential function or a log function. However, the cost function may be an injective function (a sign of a gradient is constant).

Next, as illustrated in FIG. 7, the three-dimensional space is restored (a three-dimensional map corresponding to b is generated and displayed) using a selected information acquisition point "b".

Next, as illustrated in FIG. 8, when the observer moves to leave the current position, a three-dimensional map for the three-dimensional space which is restored by the information acquisition point "b" is hidden and removed from the memory.

In this case, when the information acquisition point "d" is selected in accordance with the movement of the observer, the three-dimensional information of the information acquisition point "d" may be restored. For example, a surrounding virtual reality environment may be changed from (a) of FIG. 9 to (b) of FIG. 9 in accordance with the movement of the observer. In FIG. 9, (a) is a view illustrating a movement of a character (observer) in a virtual reality environment and (b) is a view illustrating a 3D environment which is different from a previous environment.

As described above, when a process of restoring the three-dimensional information at the information acquisition point and then removing the three-dimensional information is repeated, since the environment around the observer continuously changes, the observer may feel a feeling of going forward or backward to the surrounding environment.

In the meantime, the process of restoring the three-dimensional information at the information acquisition point and then removing the three-dimensional information is applied to all spaces, since the user manipulates the avatar in the virtual space, it may feel that not local space, but the entire virtual space is three-dimensionally restored due to continuous updating of the three-dimensional information.

That is, as the avatar moves, if the three-dimensional map is continuously updated and displayed by the three-dimensional information corresponding to the position of the avatar, even though the avatar views local three-dimensional information at one viewpoint, the three-dimensional information is consistently updated in accordance with the movement of the avatar. Therefore, it may feel like the avatar goes around a large 3D space.

An example for explaining the present solution in accordance with the exemplary scenario in more detail will be described as follows.

There are information acquisition points A and B in the global space 0, an arbitrary object K which does not move is in a coordinate of a in a local coordinate system where the point A is an origin and in a coordinate of b in a local coordinate system where the point B is an origin, the position of the object K may have different coordinates each in the local coordinate system with respect to the point A and the local coordinate system with respect to the point B, but may have the same coordinate with respect to the global coordinate system.

In the present solution, the information acquisition points A and B are individually managed as the local coordinate systems and two local coordinate systems are managed through one global coordinate system. Therefore, as the avatar moves from the point A to the point B, even though the object K displayed on the three-dimensional map of the local coordinate system having the point A as an origin is updated to be displayed on a three-dimensional map of the local coordinate system having the point B as an original, the object is managed to be displayed such that only the observation viewpoint of the object is changed but the position is not changed. Therefore, even though the avatar moves from the point A to the point B, the object K is displayed on the 3D map without changing the position of the object K and the user may feel that the 3D map is continuously displayed on the screen.

According to the present solution, even though the avatar moves, the 3D map is continuously updated to be displayed so that the present solution is a more advanced technique than a 2D street view technique which displays discontinuous image in accordance with the position movement on the map.

FIG. 10 is a view illustrating an example of a photograph for generating a virtual reality environment and an example of a 3D screen seen from a viewpoint of a user. In FIG. 10, (a) is an original RGB photograph, (b) is a depth image for restoring a 3D screen (three-dimensional information), and (c) is a 3D screen seen from a viewpoint of a user. It is understood that FIG. 10 is generated by projecting the original RGB photograph of (a) and the depth image of (b) into a spherical three-dimensional space so that the original RGB photograph (a) is expressed to be distorted toward the center of sphere.

In this case, a shape of the 3D screen seen from the viewpoint of the user in (c) may be a three-dimensional shape which encloses a character in the virtual reality or a planar shape which is seen only in a part of the viewing field, or may be a curved shape which encloses the entire viewing field.

When an obstacle is included in the three-dimensional information acquired at the corresponding photographing point, the display unit 130 may generate and display the three-dimensional map using three-dimensional information which is acquired at other photographing point which is the closest to the corresponding photographing point regardless of the position of the observer. In this case, it is desirable that the obstacle is not included in the three-dimensional information acquired at other photographing point.

As described above, the display unit 130 may invoke and display specific three-dimensional information regardless of an actual position of an observer in the virtual reality. Such a function is referred to as a position fake function in the present solution. The position fake function is required due to the following reason. In the present solution, the surrounding environment is automatically changed in accordance with the movement of the observer. In this case, some problems may be incurred. The case is when the user wants to observe the specific three-dimensional information closely.

Referring to FIG. 11, as illustrated in (a) of FIG. 11, it is assumed that an observer in the virtual reality observes an object C at a distance in a position A. As illustrated in (b) of FIG. 11, the observer thinks that if the observer goes to the position B, the observer can observe closer to the object C and moves to the position B. However, there is an image of other object between the observer and the object C. For example, at the time of collecting three-dimensional information, a person may pass between a photographer and the object C. In this case, even though the observer is closer to the object C, the observer may not identify a shape of the object C at the close position. If the observer photographs the object C in the position B, an image quality may be better than an image of the object C photographed in the position A, but the object C is not seen in the position B so that the object C cannot be observed closely.

In order to overcome the above-described problem, a function (referred to as a hold function in the present solution) of preventing three-dimensional information exchange in accordance with the movement is necessary. When the hold function is operated, it is possible to prevent the three-dimensional information exchange in accordance with the movement. When the hold function is used for a previous problem, as illustrated in (b) of FIG. 11, even though the user in the position A operates the hold function and goes to the position B, the three-dimensional information is not updated. The three-dimensional shape shown at this time is a three-dimensional shape which is reconstructed in the position A and the object C may be observed differently from the three-dimensional information which is restored by the three-dimensional information photographed in the position B. The hold function may be operated though an input button or a UI of the screen or may be automatically executed.

Here, among the techniques of automatically executing the hold function, an interface which prevents the three-dimensional information from being updated until the reproduction of the video finishes even though the observer moves may be provided for video contents. When the hold function is not provided, the observer may move even though the video contents are not finished. When the contents are planned for the user to watch the end of the video, the user may be forced to watch the video contents to the end by executing the hold function when the video reproduction starts and ending the hold function when the video ends.

According to another exemplary scenario, the display unit 130 may further perform an operation of reproducing the three-dimensional map in the format of video when the observer is located within a predetermined distance from one of the photographing points, and stopping reproducing the three-dimensional map in the format of video when the observer moves during reproduction of the three-dimensional map in the format of video to be located outside the predetermined distance from one of the photographing points. In this case, the three-dimensional map in the format of video means a type of three-dimensional information in which three-dimensional information on the three-dimensional map changes according to elapse of the time and color information RGB+alpha of the three-dimensional information changes according to the elapse of the time.

According to another exemplary scenario, the display unit 130 may further perform an operation of reproducing the three-dimensional map in the format of video when the observer is located within a predetermined distance from one of the photographing points, and stopping reproducing the three-dimensional map in the format of video when the observer moves during reproduction of the three-dimensional map in the format of video to be located outside the predetermined distance from one of the photographing points. In this case, the three-dimensional map in the format of video means a type of three-dimensional information in which three-dimensional information on the three-dimensional map changes according to elapse of the time and color information RGB+alpha of the three-dimensional information changes according to the elapse of the time.

In another exemplary scenario, the display unit 130 sets a specific threshold distance value R_repeat when the video is reproduced and repeatedly reproduces only images photographed at the photographing points within a threshold distance value from the position of the observer.

In this case, the section repeat of the video is performed with a photographing point which is the farthest from the position of the observer as a result of searching the photographing points included within a threshold distance circle in which the position of the observer is a center and a threshold distance value is a radius in a reverse order of the time with respect to the photographing time of the photographing point which is the closest to the position of the observer with respect to the position of the observer as a section repeat starting point and a photographing point which is the farthest from the position of the observer as a result of searching the photographing points in the order of time with respect to a photographing time of the photographing point which is the closest to the position of the observer as a section repeat finishing point. That is, the images acquired from the plurality of photographing points are acquired along a photographing line. In the present exemplary scenario, the video section repeat is implemented by repeatedly and sequentially reproducing an image which is first acquired within the threshold distance circle (an image acquired at the section repeat starting point) to an image which is acquired the most later (an image acquired at the section repeat finishing point) with a photographing point at which the image is first acquired on the photographing line within a threshold distance circle as the section repeat starting point and a photographing point at which the image is acquired the most later as the section repeat finishing point.

For example, when the observer is located near a 140-th photographing point, the display unit 130 sets a 119-th photographing point at which the image is first photographed among the photographing points included in a threshold distance circle in which the position of the observer is a center and a predetermined threshold distance value (for example, 5 m) is a radius, as the section repeat starting point and a 151-st photographing point at which the image is photographed the most later, as the section repeat finishing point and then sequentially and repeatedly reproduces the images photographed at the 119-th to 151-st photographing points to perform the video section repeat. It is possible to provide more vivid three-dimensional information to the user through the above-described video section repeat.

In the meantime, according to still another exemplary scenario, the observer moves during the video section repeat so that the section repeat starting point and the section repeat finishing point may be changed. In this case, the display unit 130 may successively reproduce an image photographed at a photographing point immediately next to a photographing point corresponding to a photographing point of an image which is reproduced immediately before the observer moves instead of performing the video section repeat based on a new section repeat starting point and a new section repeat finishing point according to a new observer position so as not to generate a video jump according to the movement of the observer. Here, video jump means sudden movement to another discontinued image frame by a user's input during reproduction of continuous image frames.

For example, when the observer is located at a 140-th photographing point, the 119-th photographing point is set as a section repeat starting point, and a 151-st photographing point is set as a section repeat finishing point, if the observer moves to a 148-th photographing point during reproduction of an image at a 140-th photographing point so that the section repeat starting point is changed to a 126-th photographing point and the section repeat finishing point is changed to a 155-th photographing point, the display unit 130 does not reproduce an image at the 126-th photographing point (a changed section repeat starting point) nor reproduce an image at the 148-th photographing point (a changed observer position), but reproduces an image at a 141-st photographing image to smoothly reproduce the video regardless of the movement of the observer.

However, when a movement speed of the observer is so fast so that a threshold distance circle with an observer position after movement as a center and a threshold distance circle with an observer position before movement as a center do not overlap, the video jump may be allowed.

In the meantime, the display unit 130 loads three-dimensional information on a three-dimensional map which is stored in advance corresponding to the point at which the observer is located to display the three-dimensional map using corresponding the three-dimensional information whenever the observer moves.

Specifically, the display unit 130 may provide a function of calculating which three-dimensional information is invoked by an observer in the virtual reality to be displayed in the program in advance before executing the program to store in the form of three-dimensional information. When the above-described function is utilized, a computational burden to select a lot of three-dimensional information every movement is reduced so that it helps to increase real-time property. This is implemented by the following method. When an observer in the virtual reality is located in an arbitrary position, which three-dimensional information needs to be invoked in the corresponding position is calculated in advance before executing the program. Further, when manual manipulation is required, the three-dimensional information is manually modified. Arbitrary points which have been calculated as described above are set as areas. When the program is executed, if the observer in the virtual reality enters the corresponding area, three-dimensional information to be displayed is selected using a result which has been calculated and stored in advance without performing an operation for searching necessary three-dimensional information. For example, FIG. 12 illustrates that a space is segmented to calculate which information acquisition point is selected at which position along a position of the observer for every movement path in advance and the three-dimensional space is segmented to store the photographed three-dimensional information.

The calculating unit 140 calculates a grouping index for a plurality of local coordinate systems generated by the generating unit 120. Here, the grouping index may be defined by one value obtained by quantifying an estimated error between two or more pose information associated with the local coordinate system, a distortion due to an influence of light when three-dimensional information acquired at the selected photographing points is matched into one, and an error of the three-dimensional information (distance information) acquired from each pose information.

In this case, the grouping index may be defined as a weighted sum of a plurality of estimated errors as represented in the following Equation 2.

$$J_{err}=W_1 \times e_1^2+W_2 \times e_2^2+\ldots+W_n \times e_n^2 \qquad [\text{Equation 2}]$$

In this case, W is a weight, a sum of weights from W1 to Wn is 1, e is an error of three-dimensional information and e1, e2, and e3 are error variables representing different uncertainties. In order to estimate the error variables, In the meantime, as an error variable of a single information acquisition point (photographing point), a variance, a standard deviation, and mahalanobis distance of position estimation may be used. Further, as an error variable indicating a degree of similarity between a plurality of information acquisition points, a covariance of an image or an energy function of comparing three-dimensional feature point information may be used.

The managing unit 150 compares the calculated grouping index with a specific threshold value to generate a group local coordinate system and an independent local coordinate system by dividing the plurality of local coordinate systems and manages the generated group local coordinate system and the independent local coordinate system in one global coordinate system.

For example, when a grouping index between two or more pose information associated with the local coordinate system is lower than a threshold value, two or more pose information are collectively generated as a group local coordinate system. Further, when the grouping index is higher than the threshold value, two or more pose information are generated as separate independent local coordinates.

As described above, if the grouping index is set, three-dimensional information corresponding to the pose information whose grouping index is lower than the threshold value is considered to be similar three-dimensional information and the pose information is collectively generated as the group local coordinate system rather than the independent local coordinate system, it is possible to prevent unnecessary three-dimensional map from being updated so that a quantity of three-dimensional information used to generate the three-dimensional map may be reduced.

For example, when three-dimensional information corresponding to the plurality of pose information is very similar to each other, even though the avatar moves to update the three-dimensional map using new three-dimensional information, there is no change on the screen that the user sees. In this case, there is no need to update the three-dimensional map using all the similar three-dimensional information, so that pose information corresponding to a plurality of similar three-dimensional information is managed as a grouping coordinate to update a three-dimensional map using only one of the plurality of three-dimensional information. Therefore, unnecessary updating may be prevented.

In the meantime, when the observer enters any one photographing point among two or more photographing points corresponding to two or more pose information managed as the group local coordinate system, the three-dimensional maps are generated and displayed at one time after loading all three-dimensional information on the photographing points corresponding to the group local coordinate system.

Further, according to another exemplary scenario, after calculating a spatial contiguity and a temporal contiguity for two or more photographing points, the contiguities are compared with a specific threshold value to generate the group local coordinate system and the independent local coordinate system by dividing the plurality of local coordinate systems corresponding to the photographing points and manage the generated group local coordinate system and independent local coordinate system in one global coordinate system. In this case, when the photographing points are managed by the local coordinate system, coordinates of the photographing points are set with respect to an origin (0,0) of the individual local coordinate system to be managed. When the individual local coordinate systems are managed by the global coordinate system, a coordinate of an origin of each local coordinate system is newly set with respect to the origin of the global coordinate system and the coordinates of the photographing points are set with respect to the newly set coordinate of the origin of each local coordinate system to be managed.

The control unit 160 may entirely control operations of the three-dimensional map generating and displaying apparatus 100, that is, operations of the acquiring unit 110, the generating unit 120, the display unit 130, the calculating unit 140, and the managing unit 150.

FIG. 13 is a flowchart illustrating to explain a three-dimensional map generating and displaying method. The three-dimensional map generating and displaying method may be performed by the three-dimensional map generating and displaying apparatus 100 of FIG. 1.

Referring to FIG. 13, in step 1310, the three-dimensional map generating and displaying apparatus acquires pose information including position and rotation information on photographing points at which three-dimensional information on a three-dimensional space is acquired, with respect to a global coordinate system.

Next, in step 1320, the three-dimensional map generating and displaying apparatus calculates at least one of a spatial contiguity of the photographing points and a temporal contiguity of photographing times corresponding to the selected photographing points to generate a plurality of local coordinate systems for the three-dimensional space.

In the meantime, according to another exemplary scenario, before step 1320, a step of selecting photographing points which satisfy a predetermined condition among the photographing points may be performed. In this case, step 1320 may be performed based on the selected photographing points.

Next, in step 1330, when an observer of a virtual reality is located in the three-dimensional space, the three-dimensional map generating and displaying apparatus finds the photographing point corresponding to a point at which the observer is located using the plurality of local coordinate systems.

Next, in step 1340, the three-dimensional map generating and displaying apparatus generates and displays a three-dimensional map using the acquired three-dimensional information.

The present solution may include a computer readable medium including a program command for performing an operation implemented by various computers. The computer readable medium may include solely a program command, a local data file, and a local data structure or a combination thereof. The medium may be specifically designed or constructed for the present solution or known to those skilled in the art of computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

For now, although a specific exemplary embodiment of the present invention has been described above, it is obvious that various changes are allowed without departing the scope of the present invention. Accordingly, the scope of the present invention is not construed as being limited to the described embodiments but is defined by the appended claims as well as equivalents thereto.

As described above, although the present invention has been described by limited embodiments and drawings, the present invention is not limited to the embodiments, and it will be apparent to those skilled in the art to which the present invention pertains that various modifications and variations may be made from the description. Therefore, the spirit of the present invention needs to be interpreted only by the appended claims and all equivalent modifications are included within the spirit of the present invention.

The invention claimed is:

1. A three-dimensional map generating and displaying apparatus, comprising:
    an acquiring unit which acquires pose information including position and rotation information on photographing points at which three-dimensional information on a three-dimensional space is acquired with respect to a global coordinate system;
    a generating unit which generates a plurality of local coordinate systems for the three-dimensional space according to at least one of a spatial contiguity and a temporal contiguity of the photographing points, based on the acquired pose information; and
    a display unit which, when an observer of a virtual reality is located in the three-dimensional space, finds the photographing point corresponding to a point at which the observer is located using the plurality of local coordinate system and generates and displays the three-dimensional map using the three-dimensional information acquired from the photographing point; a calculating unit which calculates a spatial contiguity and a temporal contiguity between pose information associated with the plurality of generated local coordinate systems; and a managing unit which compares the calculated spatial contiguity and temporal contiguity with a specific threshold value to generate a group local coordinate system and an independent local coordinate system by dividing the plurality of local coordinate systems and manages the generated group local coordinate system and the independent local coordinate system in one global coordinate system.

2. The three-dimensional map generating and displaying apparatus of claim 1, further comprising:
    a calculating unit which calculates a grouping index defined as at least one of an estimated error between pose information associated with the plurality of generated local coordinate systems, an error and a distortion of the three-dimensional information acquired from the selected photographing points; and
    a managing unit which compares the calculated grouping index with a specific threshold value to generate a group local coordinate system and an independent local coordinate system by dividing the plurality of local coordinate systems and manages the generated group local coordinate system and the independent local coordinate system in one global coordinate system.

3. The three-dimensional map generating and displaying apparatus of claim 1, wherein the generating unit further performs an operation of selecting photographing points which satisfies a predetermined condition among the photographing points and an operation of generating a plurality of local coordinate systems for the three-dimensional space is performed on the selected photographing points, and the predetermined condition is a condition for selecting photographing points at which a predetermined number or more of three-dimensional information is acquired or a condition for selecting photographing points at which the number of acquired three-dimensional information is ranked to be a predetermined level or higher.

4. The three-dimensional map generating and displaying apparatus of claim 1, wherein when the observer is located at a point other than the photographing point in the three-dimensional space, the display unit sets a major axis of a bounding volume having a specific shape to pass through a center of the observer and to be parallel to a line of sight of the observer and increases or reduces a size of the bounding volume until a predetermined number of photographing points is included in the bounding volume to find the corresponding photographing point included in the bounding volume and generate and display the three-dimensional map using the three-dimensional information acquired at the corresponding photographing point.

5. The three-dimensional map generating and displaying apparatus of claim 4, wherein when a plurality of photographing points is included in the bounding volume, the display unit selects three-dimensional information having a minimum time difference from three-dimensional information of the existing position among the three-dimension information acquired from the plurality of photographing points based on a photographing time of the three-dimensional information acquired from the plurality of photographing points and generates and displays the three-dimensional map using the selected three-dimensional information.

6. The three-dimensional map generating and displaying apparatus of claim 4, wherein when the three-dimensional map is generated and displayed, if a length of the major axis of the bounding volume is larger than a predetermined distance due to the increase of the size of the bounding volume, the display unit generates and displays a three-dimensional map corresponding to the entire three-dimensional space based on the global coordinate system so that two three-dimensional maps are automatically switched according to the position of the observer to be displayed.

7. The three-dimensional map generating and displaying apparatus of claim 4, wherein when the observer rotates, the display unit axially rotates the bounding volume using a line of sight vector for a line of sight of the observer to generate and display the three-dimensional map using three-dimensional information acquired at the corresponding photographing point included in the bounding volume and in the case of a line of sight with three degrees of freedom, a line of sight vector includes vectors corresponding to roll, pitch, and yaw modes and in the case of a line of sight with one degree of freedom, the line of sight vector includes a vector corresponding to the major axis of the bounding volume.

8. The three-dimensional map generating and displaying apparatus of claim 1, wherein when the observer is located at a point other than the photographing point in the three-dimensional space, the display unit sets a plurality of cost functions based on a plurality of vectors from the photographing points to the point at which the observer is located, finds the photographing point at which a value of the set cost function becomes minimum, and generates and displays the three-dimensional map using the three-dimensional information acquired at the corresponding photographing point.

9. The three-dimensional map generating and displaying apparatus of claim 1, wherein when the observer is located at a point other than the photographing point in the three-dimensional space, the display unit sets a plurality of cost functions based on the line of sight vector for the line of sight of the observer and a plurality of vectors from the photographing points to the observer, finds the photographing point at which a value of the set cost function becomes maximum, and generates and displays the three-dimensional map using the three-dimensional information acquired at the corresponding photographing point.

10. The three-dimensional map generating and displaying apparatus of claim 8, wherein when there is a plurality of photographing points at which a value of the set cost function becomes minimum, the display unit selects three-dimensional information having a minimum time difference from three-dimensional information of the existing position among the three-dimension information acquired from the plurality of photographing points based on a photographing time of the three-dimensional information acquired from the plurality of photographing points and generates and displays the three-dimensional map using the selected three-dimensional information.

11. The three-dimensional map generating and displaying apparatus of claim 8, wherein when the three-dimensional map is generated and displayed, if lengths of the vectors from the photographing points to the observer are larger than a predetermined distance, the display unit generates and displays a three-dimensional map corresponding to the entire three-dimensional space based on the global coordinate system so that two three-dimensional maps are automatically switched according to the position of the observer to be displayed.

12. The three-dimensional map generating and displaying apparatus of claim 1, wherein when an obstacle is included in the three-dimensional information acquired at the corresponding photographing point, the display unit generates and displays the three-dimensional map using three-dimensional information acquired at other photographing point which is the closest to the corresponding photographing point regardless of the position of the observer and the obstacle is not included in the three-dimensional information acquired at other photographing point.

13. The three-dimensional map generating and displaying apparatus of claim 1, wherein the display unit loads the three-dimensional information on the three-dimensional map which is stored in advance corresponding to a point at which the observer is located to display the three-dimensional map using the three-dimensional information whenever the observer moves.

14. The three-dimensional map generating and displaying apparatus of claim 1, wherein the display unit further performs an operation of reproducing the three-dimensional map in the format of video when the observer is located within a predetermined distance from one of the photographing points, and stopping reproducing the three-dimensional map in the format of video when the observer moves during reproduction of the three-dimensional map in the format of video to be located outside the predetermined distance from one of the photographing points.

15. The three-dimensional map generating and displaying apparatus of claim 14, wherein the display unit sets a specific threshold distance value when the three-dimensional map in the format of video is reproduced and repeatedly and sequentially reproduces the three-dimensional map generated using the three-dimensional information acquired at the photographing points within a threshold distance value.

16. The three-dimensional map generating and displaying apparatus of claim 14, wherein when the three-dimensional map in the format of video is reproduced, after setting a photographing point which is the farthest from the position of the observer as a result of searching the photographing points included within a threshold distance circle in which the position of the observer is a center and a threshold distance value is a radius in a reverse order of the time with respect to the photographing time of the photographing point which is the closest to the position of the observer with respect to the position of the observer as a section repeat starting point and a photographing point which is the farthest from the position of the observer as a result of searching the photographing points in the order of time with respect to a photographing time of the photographing point which is the closest to the position of the observer as a section repeat finishing point, the display unit sequentially and repeatedly reproduces from the three-dimensional map generated using the there-dimensional information photographed at the section repeat starting point to the three-dimensional map generated using the three-dimensional information photographed at the section repeat finishing point.

17. A three-dimensional map generating and displaying method, comprising:

acquiring pose information including position and rotation information on photographing points at which three-dimensional information on a three-dimensional space is acquired with respect to a global coordinate system;

generating a plurality of local coordinate systems for the three-dimensional space according to at least one of a spatial contiguity and a temporal contiguity of the photographing points, based on the acquired pose information;

calculating a spatial contiguity and a temporal contiguity between pose information associated with the plurality of generated local coordinate systems; and comparing the calculated spatial contiguity and temporal contiguity with a specific threshold value to generate a group local coordinate system and an independent local coordinate system by dividing the plurality of local coordinate systems and manages the generated group local coordinate system and the independent local coordinate system in one global coordinate system;

when an observer of a virtual reality is located in the three-dimensional space, finding the photographing point corresponding to a point at which the observer is located using the plurality of local coordinate system and generating and displaying the three-dimensional map using the three-dimensional information acquired from the photographing point.

\* \* \* \* \*